United States Patent
Schiller et al.

(10) Patent No.: US 8,957,121 B2
(45) Date of Patent: Feb. 17, 2015

(54) SILICONE STABILIZERS FOR RIGID POLYURETHANE OR POLYISOCYANURATE FOAMS

(75) Inventors: Carsten Schiller, Muelheim an der Ruhr (DE); Martin Glos, Borken (DE); Christian Eilbracht, Herne (DE)

(73) Assignee: Evonik Degussa GmbH, Essen (DE)

( * ) Notice: Subject to any disclaimer, the term of this patent is extended or adjusted under 35 U.S.C. 154(b) by 503 days.

(21) Appl. No.: 13/328,135

(22) Filed: Dec. 16, 2011

(65) Prior Publication Data

US 2012/0157558 A1 Jun. 21, 2012

(30) Foreign Application Priority Data

Dec. 16, 2010 (DE) .......................... 10 2010 063 237

(51) Int. Cl.
*C08L 75/00* (2006.01)
*C08G 77/20* (2006.01)
(Continued)

(52) U.S. Cl.
CPC ................ *C08G 77/46* (2013.01); *C08G 18/61* (2013.01); *C08G 18/7664* (2013.01); *C08G 18/48* (2013.01); *C08G 77/12* (2013.01); *C08G 2101/0025* (2013.01); *C08G 2105/02* (2013.01)
USPC ........................................................ 521/137

(58) Field of Classification Search
CPC ............................... C08G 18/61; C08G 77/46
USPC ........................................................ 521/137
See application file for complete search history.

(56) References Cited

U.S. PATENT DOCUMENTS

| | | |
|---|---|---|
| 4,014,825 A | 3/1977 | Kanner |
| 4,052,495 A | 10/1977 | Uhlmann et al. |

(Continued)

FOREIGN PATENT DOCUMENTS

| | | |
|---|---|---|
| CN | 1184133 A | 6/1998 |
| CN | 1286277 A | 3/2001 |

(Continued)

OTHER PUBLICATIONS

Houben-Weyl, "Methoden der organischen Chemie", vol. E20, Thieme Verlag, Stuttgart 1987,(3), pp. 1561 to 1757.

(Continued)

*Primary Examiner* — Mike M Dollinger
(74) *Attorney, Agent, or Firm* — Scully, Scott, Murphy & Presser, P.C.

(57) ABSTRACT

A polyether siloxane of formula (I)

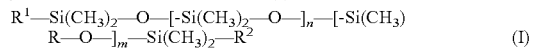

where
R, $R^1$ and $R^2$ are the same or different,
R in each occurrence is the same or different and represents $-(CH_2)_x-O-(CH_2-CR'R''-O)_y-R'''$,
R' and R'' are the same or different and each represent —H, $-CH_3$, $-CH_2CH_3$ or phenyl,
R''' represents —H, alkyl or acyl,
$R^1$ and/or $R^2$ each represent methyl or R,
wherein the alkylene oxide units ($CH_2-CR'R''-O$) within a polyether residue R can be the same or different and the polyether residues R within a polyether siloxane molecule of formula (I) can be the same or different, wherein on average (number average, averaged over all compounds of formula (I))
n+m+2=>10 to 200,
m=0 to 40 for $R^1$ and/or $R^2$ representing R
or m=1 to 40 for $R^1$ and $R^2$ representing $-CH_3$,
x=2 to 10,
y=1 to 50,
at least 25% of the R''' radicals represent hydrogen and at least 50% of all polyether residues R which have an end group R'''=—H have a secondary or tertiary OH end group. The polyether siloxane has almost no primary but overwhelmingly secondary or tertiary OH groups.

9 Claims, 2 Drawing Sheets

(51) Int. Cl.
*C08G 77/46* (2006.01)
*C08G 18/61* (2006.01)
*C08G 18/76* (2006.01)
*C08G 18/48* (2006.01)
C08G 77/12 (2006.01)
C08G 101/00 (2006.01)

(56) References Cited

U.S. PATENT DOCUMENTS

| | | | |
|---|---|---|---|
| 4,096,162 A * | 6/1978 | Windemuth et al. | 556/420 |
| 4,136,250 A | 1/1979 | Mueller et al. | |
| 4,147,847 A | 4/1979 | Schweiger | |
| 4,163,830 A * | 8/1979 | Windemuth et al. | 521/111 |
| 4,746,683 A | 5/1988 | Kilgour | |
| 4,797,501 A | 1/1989 | Myerly et al. | |
| 4,855,379 A | 8/1989 | Budnik et al. | |
| 5,090,405 A * | 2/1992 | Jansen et al. | 602/8 |
| 5,169,872 A | 12/1992 | Petroff et al. | |
| 6,071,977 A | 6/2000 | Austin et al. | |
| 6,552,091 B1 | 4/2003 | Boinowitz et al. | |
| 7,157,541 B2 | 1/2007 | Knott et al. | |
| 7,196,153 B2 | 3/2007 | Burkhart et al. | |
| 2008/0125503 A1 | 5/2008 | Henning et al. | |
| 2009/0253817 A1 * | 10/2009 | Gu et al. | 521/112 |

FOREIGN PATENT DOCUMENTS

| | | |
|---|---|---|
| CN | 1365990 A | 8/2002 |
| CN | 101096425 A | 1/2008 |
| CN | 101099926 A | 1/2008 |
| CN | 101125952 A | 2/2008 |
| CN | 101125952 A | 2/2008 |
| CN | 101367996 A | 2/2009 |
| CN | 101891961 A | 11/2010 |
| DE | 19940797 A1 | 8/1999 |
| DE | 102006030531 A1 | 1/2008 |
| EP | 0533202 A1 | 9/1992 |
| EP | 0293125 B1 | 5/1994 |
| EP | 0570174 B1 | 2/1996 |
| EP | 0493836 B1 | 8/1999 |
| EP | 0877045 B1 | 1/2002 |
| EP | 1360223 A0 | 11/2003 |
| EP | 1439200 A1 | 7/2004 |
| EP | 1520870 A1 | 4/2005 |
| EP | 1544235 A1 | 6/2005 |
| JP | 892404 | 4/1996 |
| WO | WO02053625 A2 | 7/2002 |
| WO | 2009123910 A2 | 10/2009 |

OTHER PUBLICATIONS

"Ullmann's Encyclopedia of Industrial Chemistry", vol. A21, VCH, Weinheim, 4th edition 1992, pp. 665 to 715.

European Search Report dated Mar. 1, 2012 received in a corresponding foreign application.

Chinese Office Action dated Aug. 5, 2014 received from related Application No. 201110431773.1 together with an English-language translation.

* cited by examiner

SILICONE STABILIZERS FOR RIGID POLYURETHANE OR POLYISOCYANURATE FOAMS

FIELD OF THE INVENTION

The present invention relates to polyether siloxanes and their use as foam stabilizers in the production of polyurethane or polyisocyanurate foams, more particularly rigid foams, which offer advantageous performance characteristics, such as low thermal conductivity and, more particularly, good surface quality.

BACKGROUND

Rigid polyurethane and polyisocyanurate foams are produced using cell-stabilizing additives to ensure a fine-celled, uniform and low-defect foam structure and hence to exert an essentially positive influence on the performance characteristics, particularly the thermal insulation performance, of the rigid foam. Surfactants based on polyether-modified siloxanes are particularly effective and therefore represent a preferred type of foam stabilizer.

Since there are a multiplicity of different rigid foam formulations for different fields of use where the foam stabilizer has to meet individual requirements, polyether siloxanes of varying structure are used. One of the selection criteria for the foam stabilizer is the blowing agent present in the rigid foam formulation.

There have already been various publications concerning polyether siloxane foam stabilizers for rigid foam applications. EP 0 570 174 B1 describes a polyether siloxane of the structure $(CH_3)_3SiO[SiO(CH_3)_2]_x[SiO(CH_3)R]_ySi(CH_3)_3$, the R radicals of which consist of a polyethylene oxide linked to the siloxane through an SiC bond and end-capped at the other end of the chain by a $C_1$-$C_6$ acyl group. This foam stabilizer is suitable for producing rigid polyurethane foams using organic blowing agents, particularly chlorofluorocarbons such as CFC-11.

The next generation of chlorofluorocarbon blowing agents are hydrochlorofluorocarbons such as, for example, HCFC-123. When these blowing agents are used for rigid polyurethane foam production, it is polyether siloxanes of the structural type $(CH_3)_3SiO[SiO(CH_3)_2]_x[SiO(CH_3)R]_ySi(CH_3)_3$ which are suitable according to EP 0 533 202 A1. The R radicals in this case consist of SiC-bonded polyalkylene oxides which are assembled from propylene oxide and ethylene oxide and can have a hydroxyl, methoxy or acyloxy function at the end of the chain. The minimum proportion of ethylene oxide in the polyether is 25 percent by mass.

EP 0 877 045 B1 describes analogous structures for this production process which differ from the first-named foam stabilizers in that they have a comparatively higher molecular weight and have a combination of two polyether substituents on the siloxane chain.

The production of rigid polyurethane foams using purely hydrofluorocarbons, e.g., Freon, as a blowing agent may, according to EP 0 293 125 B1, also utilize mixtures of different stabilizers, for example, the combination of a purely organic (silicon-free) surfactant with a polyether siloxane.

A more recent development in the production of rigid polyurethane foams is to dispense with halogenated hydrocarbons as blowing agents entirely and to use hydrocarbons such as pentane instead. EP 1 544 235 describes the production of rigid polyurethane foams using hydrocarbon blowing agents and polyether siloxanes of the already known structure $(CH_3)_3$ $SiO[SiO(CH_3)_2]_x[SiO(CH_3)R]_ySi(CH_3)_3$ having a minimum chain length for the siloxane of 60 monomer units and different polyether substituents R, the mixed molecular weight of which is in the range from 450 to 1000 g/mol and the ethylene oxide fraction of which is in the range from 70 to 100 mol %.

DE 10 2006 030 531 describes the use of polyether siloxanes, as foam stabilizers in which the end group of the polyethers is either a free OH group or an alkyl ether group (preferably methyl) or an ester. Particular preference is given to using such polyether siloxanes which have free OH functions. The use of the specific polyether siloxanes is said to exert a positive influence on the fire behaviour.

U.S. Pat. No. 4,014,825 describes organomodified siloxanes for polyurethane foam production which, in addition to alkyl and polyether substituents, also bear side chains having tertiary OH groups. Thus, additional substituents are introduced in the '825 patent. The polyethers used in the '825 patent are usually methyl endblocked. Generally, the polyethers do not have a specific arrangement of the alkylene oxide units, and so there is no defined OH functionality in the case of a non-endblocking.

U.S. Pat. No. 4,746,683 describes improving the open-cell content of high resiliency flexible foams by using polyether siloxanes wherein a high proportion of the polyethers bear secondary or tertiary OH groups. The siloxanes contain not more than 10 silicon atoms and the polyethers consist of 3 to 13 oxyalkylene units.

Yet the foam stabilizers described in the aforementioned publications do not offer the desired optimal foam properties over the whole spectrum of the various rigid foam formulations, and there are many fields where improvements in foam stabilizers over the prior art are desirable in order to further optimize the performance characteristics of rigid foams, particularly in respect of thermal conductivity and foam defects at the surface.

It is typically the foam defects at the surface which are increasingly becoming the center of attention. In the case of refrigerators and metal composite elements (wall elements for the construction of buildings) for example, where polyurethane foam is faced with layers of steel sheet, voids in the foam which are directly underneath the face layer can be visible as bulges or blisters on the surface of the face layer and thus convey an impression of poor quality to an observer. In addition to the visual impression, physical characteristics also suffer when such foam defects are present. For example, face layer adherence and thermal insulation performance generally worsen in their initial values and can additionally suffer accelerated ageing with further deterioration in the values. This problem is also known in the case of polyurethane or polyisocyanurate insulation panels.

The extent of near-surface foam defects can be very efficiently influenced through the choice of foam stabilizer. Polyether siloxanes having so-called endblocked polyether side groups, i.e., polyethers which instead of an OH group have a terminal alkyl ether or ester group, are known for comparatively defect-free surface qualities. Unfortunately, these foam stabilizers are less soluble in polyol formulations than OH-functional products. The use of insoluble foam stabilizers in preformulated polyol systems of the kind commercially customary for the fields of refrigerator insulation and metal composite elements is ruled out by the risk of phase separation of the formulation during prolonged storage times prior to processing. Therefore, the use of fully endblocked foam stabilizers for improving the surface quality in the case of refrigerator applications, in particular, but also in many other fields of application is only possible to a limited extent, if at all.

SUMMARY OF THE INVENTION

In one embodiment, the present invention provides alternative foam stabilizers which allow the production of polyurethane or polyisocyanurate foams of good surface quality—that is, few voids and densifications in the contact region with the face layers—without having one or more of the disadvantages known from the prior art, such as, for example, poor system solubility.

In another embodiment, the present invention provides rigid polyurethane or polyisocyanurate foams and their underlying formulations that offer particularly advantageous performance characteristics, for example, good surface quality and/or low thermal conductivity.

The applicants of the present invention have surprisingly found that polyether siloxanes of formula (I), as described hereinbelow, which have almost no primary but overwhelmingly secondary and/or tertiary OH groups, can achieve one or more of the aforementioned embodiments. This is surprising because U.S. Pat. No. 4,746,683 describes improving the open-cell character of high resiliency flexible foams through the use of polyether siloxanes having overwhelmingly secondary or tertiary OH groups, while compounds of formula (I) provide a very high closed-cell content to rigid foams.

The present invention accordingly provides polyether siloxanes of formula (I), as described hereinbelow, which have almost no primary but overwhelmingly secondary or tertiary OH groups, and the use of the inventive polyether siloxanes for producing polyurethane foams and polyisocyanurate foams.

The present invention further provides a composition suitable for producing rigid polyurethane or polyisocyanurate foams, containing at least one isocyanate component, at least one polyol component, at least one foam stabilizer, at least one urethane and/or isocyanurate catalyst, water and/or blowing agent, and optionally at least one flame retardant and/or further additives, characterized in that at least one polyether siloxane according to the invention is present as a foam stabilizer. The present invention even further provides a process for producing rigid polyurethane or polyisocyanurate foams, and also the rigid polyurethane or polyisocyanurate foams obtainable thereby.

The present invention also provides for the use of rigid polyurethane or polyisocyanurate foams according to the invention as insulation boards, insulants and in the form of metal composite elements as an engineering element for the construction of buildings, cold stores, refrigerated containers and heavy goods vehicles, and also a refrigerating apparatus which includes a rigid polyurethane foam or polyisocyanurate foam according to the invention as insulating material.

The inventive polyether siloxanes have the advantage of providing polyurethane or polyisocyanurate foams, more particularly rigid foams, which are marked by a good fine-cell content and good insulating properties and at the same time have little by way of foam defects. Particularly the foam defects (voids, densifications) at the interface to the face layer which are problematical in the case of composite systems combining rigid foam with flexible or rigid face layers can be efficaciously minimized compared with the prior art using the polyether siloxanes according to the invention.

DETAILED DESCRIPTION OF THE INVENTION

Figure 1A:
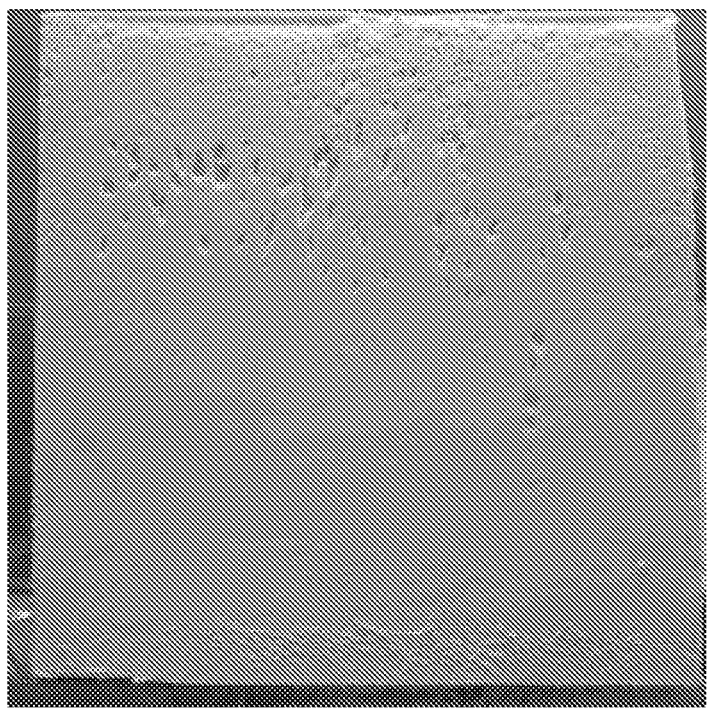
FIG. 1A is an actual picture of a foam obtained using a polyether siloxane of the present invention.

The inventive polyether siloxanes, compositions and polyurethane foams and also uses thereof will now be described by way of example without any intention to restrict the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention particularly in respect of the factual position in the context of which the document was cited. Average values indicated in what follows are number averages, unless otherwise stated.

The polyether siloxanes of the present invention comprise a compound of formula (I)

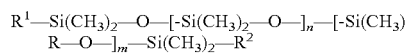

where

R, $R^1$ and $R^2$ are the same or different, $R^1$ and/or $R^2$ each represent methyl or R, R in each occurrence is the same or different and represents $-(CH_2)_x-O-(CH_2-CR'R''-O)_y-R'''$, R' and R'' are the same or different and each represent $-H$, $-CH_3$, $-CH_2CH_3$ or phenyl, R''' represents $-H$, alkyl or acyl, preferably alkyl of 1 to 40 and preferably 1 to 24 carbon atoms or acyl of 1 to 40 and preferably 1 to 24 carbon atoms, wherein the alkylene oxide units $(CH_2-CR'R''-O)$ within a polyether residue R can be the same or different and the polyether residues R within a polyether siloxane molecule of formula (I) can be the same or different, characterized in that on average (number average, averaged over all compounds of formula (I))

$n+m+2 \Rightarrow 10$ to 200, preferably 12 to 100, more preferably 15 to 50 and even more preferably 20 to 40, m=0 to 40 for $R^1$ and/or $R^2$ representing R or m=1 to 40 for $R^1$ and $R^2$ representing $-CH_3$, x=2 to 10, y=1 to 50, at least 25%, preferably at least 50% and more preferably 100%, of the R''' radicals represent hydrogen and at least 50%, preferably at least 70%, of all polyether residues R which have an end group R'''=$-H$ have a secondary or tertiary OH end group, i.e. a terminal alkylene oxide unit with R' and/or R'' other than $-H$.

The inventive polyether siloxanes of formula (I) are copolymers which, by the nature of their method of making, are usually polydispserse compounds, so that only averages can be indicated for the parameters n, m, x and y.

The ratio of primary to secondary/tertiary OH groups can be influenced, for example, by the polyethers used in the synthesis or by the amount of blocking reagent used. The ratio of primary to secondary and tertiary OH end groups can be determined using NMR methods. Preferably, the determination is effected as hereinbelow described using an NMR spectrometer with a processor unit and autosampler with 5 mm sample head from Bruker, type 400 MHz, 10 mm QNP using 5 mm sample tubes and closure caps made of plastic, both from Norell Inc. Sampling is done using Pasteur pipettes from Brand. Reagents used are: deuterochloroform (CDCl$_3$) from Deutro, degree of deuterization 99.8%), A3 molecular sieve from Merck (to remove water residues from the solvent).

The measurements are carried out using the measurement parameters reported in Table A:

TABLE A

Measurement parameters for NMR measurements

|  | $^1$H NMR | $^{13}$C NMR |
|---|---|---|
| sample quantity | about 20 mg | about 1 g |
| CDCl$_3$ volume | about 1.25 ml | about 5 ml |
| transmitter frequency | 399.87 MHz | 100.565 MHz |
| pulse | 8 | 10 |
| relaxation time | 0 sec | 10 sec |
| transmitter offset | 1350.0 Hz | 11 000 Hz |
| measuring time | 16 | 512 |
| line width | 0.1 Hz | 1 Hz |

The stated sample quantity is introduced into a clean NMR tube and admixed with the stated volume of CDCl$_3$. The sample tube is sealed with the plastic cap and the sample is homogenized by shaking. After all the air bubbles have risen to the surface, the sample is measured in the NMR spectrometer. Assigning the individual signals is familiar to a person skilled in the art, or can optionally be done by comparison with the signals of suitable example substances. Evaluation in respect of the molar ratios of free OH groups (R'''=H) to endblocked OH groups (R''' other than H) is done by forming the ratios of the corresponding integrals of the signals assigned to the respective groups. To ensure comparability of the signals, a person skilled in the art will be familiar with adding so-called accelerators to the samples. A suitable accelerator can be determined by a person skilled in the art by measuring model substances for which the molar ratio is known. Suitable accelerators are those wherein the measured ratio does not differ from the actual ratio by more than 5%. An example of an accelerator which can be used is chromium acetylacetonate, which is added in concentrations of about 0.8% by mass based on the sample quantity.

In one embodiment, it can be advantageous for the polyether substituents to be situated in the comb (lateral) position of the siloxane chain (m other than 0). In addition, polyether substituents can be present on the terminal silicon atoms of the siloxane chain (R' and/or R$^2$=R).

The end group of the polyether residues is either a free OH group or an alkyl ether group (preferably methyl) or an ester formed by esterification of the OH group with any desired carboxylic acid (preferably acetic acid). It can be advantageous when some of the R''' radicals are alkyl radicals, preferably exclusively methyl radicals, but what is essential to the present invention is that on average (number average, averaged over all compounds of formula (I)) at least 25% of the polyethers bear an OH end group (i.e. R'''=—H) and that these OH groups are overwhelmingly (at least 50%) secondary or tertiary OH groups.

The alkylene oxide units bearing the index y are preferably ethylene oxide, propylene oxide, n-butylene oxide, isobutylene oxide and styrene oxide. The amount of substance proportion attributable to ethylene oxide is preferably at least 45 mol % and more preferably at least 65 mol %.

The sequence of the various alkylene oxide units—apart from the endblock in the case of OH-functional polyethers— can be freely chooseable, i.e., it can be either random or subject to a specific blocked construction. In the case of OH-functional polyether residues, a diblock construction consisting of a purely ethylene oxide block and the final endblock of an alkylene oxide other than ethylene oxide can be particularly advantageous.

The polyethers in any one molecule can be identical to or different from each other, provided the polyether mixture satisfies the above definitions. Mixtures of various polyether siloxanes are also included, provided that either the average values of the mixtures come within the abovementioned ranges or a component conforms to the above definition.

Particularly preferred inventive polyether siloxanes are those wherein on average n+m+2 is in the range from 15 to 100, x is 3 and y is in the range from 5 to 25 and both R$^1$ and R$^2$ are polyether residues of the R type.

The polyether siloxanes according to the present invention are in principle obtainable according to the prior art processes for preparing polyether siloxanes.

The inventive polyether siloxanes are preferably synthesized using a platinum-catalyzed reaction of Si—H-functional siloxanes with terminally unsaturated polyethers. A detailed description is given in EP 1 520 870, which is hereby incorporated herein by reference and forms part of the disclosure content of the present invention. EP 0 493 836 describes the preparation of polyether-modified siloxanes used in flexible foams. Further examples relating to the preparation of appropriate siloxanes are described, for example, in U.S. Pat. No. 4,147,847 and U.S. Pat. No. 4,855,379.

The precursors used in this so-called hydrosilylation reaction are in turn obtainable using established chemical processes:

The Si—H-functional siloxanes are obtainable by reaction of SiH-free siloxanes, preferably, for example, hexylmethyl disiloxane and decamethylcyclopentasiloxane, with Si—H-functional siloxanes, preferably linear polymethylhydrosiloxanes, for example, HMS-993 from Gelest Inc., and optionally linear α,ω-dihydropolydimethylsiloxanes, for example 1,1,3,3-tetramethyldisiloxane, in an acid-catalysed equilibration reaction. The average structure of the product is determined via the ratio of raw materials used.

The terminally unsaturated polyethers are obtainable by reacting terminally unsaturated starter alcohols, preferably allyl alcohol, with various alkylene oxides, preferably under alkaline catalysis with, for example, alkali metal hydroxides or double metal cyanide (DMC) catalysis. The sequence of the polyethers obtained is controlled during reaction via the metering of the alkylene oxides. Block structures are obtainable by first adding alkylene oxide A onto the starter alcohol and, once complete conversion is reached, metering in the alkylene oxide B for addition onto the intermediate. Random sequences are obtainable by using the alkylene oxides A and B in mixed form. Once the desired sequence and molar mass have been synthesized, the polyethers can optionally be subjected either directly to an aqueous work-up, in which case products having a terminal OH function are obtained, or optionally subjected to a further reaction step for endblocking, for example by reaction with methyl chloride to form a methyl ether end group by a Williamson reaction. For instance, EP 1 360 223 and the documents cited therein describe the preparation of olefinic polyethers with and without derivatization of the OH functionality.

Various methods can be used to obtain the inventive proportion of secondary or tertiary OH end group. One possibility, for example, is to add a block of on average 0.5 to 5 and preferably 1 to 3 alkylene oxide units per polyether molecule with R' and/or R'' other than —H in a final addition reaction in the course of the preparation of the polyethers. Examples of suitable alkylene oxides for this endblock are propylene oxide, butylene oxide, isobutylene oxide and styrene oxide.

Apart from the described endblock in the case of OH-functional polyethers, a very wide variety of alkylene oxides can be used for preparing the polyether residues, preference being given to ethylene oxide, propylene oxide, optionally butylene oxide and optionally styrene oxide. The amount of substance proportion of ethylene oxide should preferably be at least 45 mol % and more preferably at least 65 mol %, averaged over all polyether residues in all molecules conforming to formula I. The sequence of the various alkylene oxide units—apart from the endblock in the case of OH-functional polyethers—is freely chooseable, i.e., it is obtainable either through random incorporation or through a specific blocked construction. Especially in the case of the OH-functional polyether residues, it can be advantageous to obtain a diblock construction, in which case a purely ethylene oxide block is produced first and then the final endblock wherein an alkylene oxide other than ethylene oxide is used in the final step.

The polyether siloxanes according to the invention can be used in all known applications where polyether siloxanes are used. Preferably, the polyether siloxanes according to the invention are used for producing polyurethane foams and polyisocyanurate foams, more particularly for producing rigid polyurethane or polyisocyanurate foams.

The compositions according to the invention which are suitable for producing rigid polyurethane or polyisocyanurate foams and are usually divided up into two components, contain at least one isocyanate component, at least one polyol component, at least one foam stabilizer, at least one urethane and/or isocyanurate catalyst, optionally water and/or blowing agents, and optionally at least one flame retardant and/or further additives, and are marked in that by way of a foam stabilizer they contain at least one inventive polyether siloxane or a polyether siloxane mixture which includes or consists of polyether siloxanes according to the invention. When the composition according to the invention has been divided up into two or more components prior to processing, the inventive polyether siloxane or polyether siloxane mixture is preferably not included in the component which contains the isocyanate component.

In the composition according to the invention, the mass fraction attributable to inventive polyether siloxane (as foam stabilizers) based on 100 parts by mass of polyol component (pphp) is preferably in the range from 0.1 to 10 pphp, more preferably in the range from 0.5 to 5 pphp and even more preferably in the range from 1 to 3 pphp.

By way of isocyanate component, the composition according to the invention can include any isocyanate compound suitable for producing rigid polyurethane or polyisocyanurate foams. Preferably, the composition according to the invention includes one or more organic isocyanates having two or more isocyanate functions, for example, 4,4'-diphenylmethane diisocyanate (MDI), toluene diisocyanate (TDI), hexamethylene diisocyanate (HMDI) and isophorone diisocyanate (IPDI). What is particularly suitable is the mixture of MDI and more highly condensed analogues having an average functionality in the range from 2 to 4 which is known as "polymeric MDI" ("crude MDI"), and also the various isomers of TDI in pure form or as isomeric mixture.

Suitable polyols for the purposes of this invention include any organic substance having two or more isocyanate-reactive groups, and also preparations thereof. Any polyether polyols and polyester polyols customarily used for producing polyurethane foams are preferred polyols. Polyether polyols are obtainable by reacting polyfunctional alcohols or amines with alkylene oxides. Polyester polyols are based on esters of polybasic carboxylic acids (which can be either aliphatic, for example, adipic acid, or aromatic, for example phthalic acid or terephthalic acid) with polyhydric alcohols (usually glycols).

A suitable ratio of isocyanate and polyol, expressed as the index of the formulation, i.e. as stoichiometric ratio of isocyanate groups to isocyanate-reactive groups (e.g., OH groups, NH groups) multiplied by 100, is in the range from 10 to 1000 and preferably in the range from 80 to 350.

By way of urethane and/or isocyanurate catalysts, the composition according to the invention preferably includes one or more catalysts for the reactions of isocyanate-polyol and/or isocyanate-water and/or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylamino-ethoxyethanol and bis(dimethylaminoethyl)ether, tin compounds such as dibutyltin dilaurate or tin(II) 2-ethylhexanoate and potassium salts such as potassium acetate and potassium 2-ethylhexanoate.

Preferred amounts of catalysts present in the composition according to the invention depend on the type of catalyst and are typically in the range from 0.05 to 5 pphp (=parts by mass per 100 parts by mass of polyol) or from 0.1 to 10 pphp for potassium salts.

Suitable water contents for the purposes of this invention depend on whether or not one or more blowing agents are used in addition to the water. In the case of purely water-blown foams, the values are typically in the range from 1 to 20 pphp, but when other blowing agents are used in addition, the amount of water used typically reduces to the range from 0 to 5 pphp.

When additional blowing agents are present in the composition according to the invention, these can be physical or chemical blowing agents. The composition preferably includes physical blowing agents. Suitable physical blowing agents for the purposes of this invention are gases, for example, liquefied $CO_2$, and volatile liquids, for example, hydrocarbons having 3 to 5 carbon atoms, preferably cyclopentane, isopentane and n-pentane, hydrofluorocarbons, preferably HFC 245fa, HFC 134a and HFC 365mfc, hydrochlorofluorocarbons, preferably HCFC 141b, oxygen-containing compounds such as methyl formate and dimethoxymethane, or chlorinated hydrocarbons, preferably 1,2-dichloroethane.

In addition to or in lieu of water and any physical blowing agents, it is also possible to use other chemical blowing agents which react with isocyanates to evolve a gas, an example being formic acid.

By way of flame retardants, the composition according to the invention may include any known flame retardant suitable for producing rigid polyurethane or polyisocyanurate foams. Suitable flame retardants for the purposes of this invention are preferably liquid organic phosphorus compounds, such as halogen-free organic phosphates, e.g., triethyl phosphate (TEP), halogenated phosphates, e.g., tris(1-chloro-2-propyl) phosphate (TCPP) and tris(2-chloroethyl)phosphate (TCEP) and organic phosphonates, e.g., dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids, such as expandable graphite and melamine The inventive process for producing rigid polyurethane or polyisocyanurate foams includes that an inventive composition as described above is reacted with at least one isocyanate component and at least one polyol component. A comprehensive review of the prior art, of the raw materials used and of processes which can be used is found in G. Oertel (ed.): "Kunststoffhandbuch", volume VII, C. Hanser Verlag, Munich, 1983, in Houben-Weyl: "Methoden der organischen Chemie", volume E20, Thieme Verlag, Stuttgart 1987, (3), pages 1561 to 1757, and in "Ullmann's Encyclopedia of Industrial Chemistry", vol. A21, VCH, Weinheim, 4th edition 1992, pages 665 to 715.

The composition according to the invention and/or the process according to the invention provide rigid polyurethane or polyisocyanurate foams.

A preferred composition, more particularly a rigid polyurethane or polyisocyanurate foam formulation for the purposes of this invention, produces rigid polyurethane or polyisocyanurate foams having a foam density in the range from 5 to 200 kg/m$^3$ and preferably in the range from 5 to 50 kg/m$^3$, and has the following composition:

TABLE 1

Typical rigid foam formulation

| Component | Weight fraction |
| --- | --- |
| Polyol | 100 |
| amine catalyst | 0.05 to 5 |
| potassium trimerization catalyst | 0 to 10 |
| polyether siloxane of formula (I) | 0.5 to 5 |
| Water | 0 to 20 |
| blowing agent | 0 to 40 |
| flame retardant | 0 to 50 |
| isocyanate index: 80 to 350 | |

Since the composition according to the invention apart from a few exceptions has been divided up into two components prior to being reacted, the components have to be mixed together to be reacted. This can be done by any method known to a person skilled in the art, for example by manual mixing or preferably by means of low or high pressure foaming machines. Batch processes can be used, for example in the manufacture of molded foams, refrigerators and panels, or continuous processes, for example in the case of insulation boards and metal composite elements (in the so-called double belt process), in the case of blocks or in the case of spraying processes.

The 1- and 1.5-component canned foams are a special case. In this use, the composition according to the invention is filled into an aerosol can while undergoing a reaction wherein the polyol, any other isocyanate-reactive components and the excess isocyanate combine to form a prepolymer. In use, this prepolymer is discharged from the aerosol can as a foam using a propellant gas, and cures by postcrosslinking under the influence of (atmospheric) humidity/moisture. The polyether siloxanes according to the invention can also be used as foam stabilizers in this application.

The rigid polyurethane or polyisocyanurate foams according to the invention are obtainable by the process according to the invention. The proportion of polyether siloxane according to the invention present in bound and/or unbound form in the rigid polyurethane or polyisocyanurate foams according to the invention is preferably in the range from 0.1 to 10 parts by mass, more preferably in the range from 0.5 to 5 parts by mass and even more preferably in the range from 1 to 3 parts by mass based on 100 parts by mass of polyol component.

The rigid polyurethane or polyisocyanurate foams according to the invention can be used as, or for producing, insulation boards and insulants or insulating materials. This provides cooling apparatuses, for example, refrigerators or freezer chests, including a rigid polyurethane or polyisocyanurate foam according to the invention as an insulating material.

Some particularly preferred applications will now be described without any intention to restrict the subject matter of the invention to these preferred embodiments.

A preferred embodiment of the present invention employs the compositions according to the invention as PUR formulations (index below 200) which are to be used in foaming in a batch operation in a mold. These molds are often dimensioned such that the foaming mixture has long flow paths and thereby the susceptibility to foam disruptions increases. Here the use of the compositions according to the invention can minimize the susceptibility to foam disruptions.

The compositions according to the invention are preferably employed in the production of refrigerators or other cooling assemblies. This involves a batch operation in which the foaming mixture is injected into the walling of the so-called cabinet (and separately of the door) and has to fill out the available space there between the outer surface layer and the inner surface layer (inliner). The foam is subjected to a flow stress, increasing the danger of defect formation. In addition, the materials used play an important part. The inliner usually consists of plastics material and the outer shell of the refrigerator usually consists of a metal surfacing layer. There must be no foam defects arising out of the interaction with these materials or any contamination present thereon. The compositions according to the present invention display a superior ability to prevent foam defects arising under these conditions. As a result, even thin surfacing layers, for example, metal surfacing layers and/or plastics surfacing layers, will provide a smooth surface to the refrigerator, since the propensity to defect formation at the boundary layer is suppressed. The plastics surfacing layers can be for example polypropylene, polyethylene or high impact polystyrene (HIPS) surfacing layers.

In a further preferred embodiment of the present invention, the compositions according to the invention are employed in the production of composite elements. Here a batch operation is used to inject the foaming composition (PUR and PIR recipes are used) between two surfacing layers. Various materials are possible for use as surfacing layers. It is usually metal surfacing layers which are used for producing metal composite elements which are then used in the building construction industry. However, plastics surfacing layers can also be used on one or both of the sides. The composite elements thus obtained, often also referred to as panels, can find use in various sectors such as the building construction industry (exteriors), in the automotive sector (caravan sector), the exposition industry (lightweight walls) or furniture production. Particularly when plastics surfacing layers are used on both sides very lightweight composite elements can be produced. The following materials can be used as surfacing layers, for example: PMMA (polymethylmethacrylate), HIPS (high impact polystyrene), PP (polypropylene), Resopal, fibre-reinforced paper types. Particular problems can arise with coatings on the metal surfacing layers or processing aids (release agents) on plastics surfaces, which can be disadvantageous for the formation of the foam. In general, the compositions according to the invention exhibit advantages in relation to surface qualities, since fewer foam defects arise than with the use of prior art siloxanes. In addition to the aesthetic aspects, the adherence of the surfacing layers to the foam can also be improved.

In a further preferred embodiment, the compositions according to the invention (or the polyether siloxanes according to the invention) are used in the continuous production of polyurethane- or polyisocyanurate-based metal panels. In this process, the foaming mixture is applied via a traversing mix head to the lower metal layer in a double band laminator at band speeds of not more than 25 m/min Often, the metal surfacing layers are profiled. In the laminator, the rising mixture then reaches the upper surfacing layer to produce a continuously formed metal panel which is cut into the desired length at the exit end of the laminator.

In this embodiment, the foaming mixture has to completely cover the often profiled surfacing layers and completely fill the space between the surfacing layers. In most cases, the foaming mixture is metered from a mix head on which a so-called casting harp can be situated. A casting harp discharges the mixture from a plurality of openings along the band direction. To obtain a uniform distribution of foam across the width of the panel, the mix head is moved traversingly across the width of the panel. A further objective is the avoidance of surface defects which can be due to coatings on the metal surfacing layers (coil coatings), since these often contain defoamers which can be harmful to the foam and/or the process of foam formation. In general, the compositions according to the invention show advantages in relation to surface qualities, since fewer foam defects arise than with the use of prior art polyether siloxanes.

arise here depending on the material, for example defoaming effects due to contamination on the surfacing layers, poor adherence, elevated flow stress in the case of very rough surfaces. The avoidance of surface defects is the primary concern. In general, the compositions according to the invention exhibit advantages here in relation to surface qualities, since fewer foam defects arise than with the use of prior art polyether siloxanes.

The examples which follow describe the present invention by way of example without any intention that the invention, the scope of which is apparent from the entire description and the claims, be restricted to the embodiments mentioned in the examples.

EXAMPLES

Example 1

Preparing Inventive Polyether Siloxanes

The polyether siloxanes described in Table 2 were prepared. The particulars in Table 2 are based on formula (I). The structural description of the polyether residues R describes the sequence of the included alkylene oxide units which corresponds to the order of blocks which was controlled via a sequential metering of the alkylene oxides in the course of preparing the polyethers.

TABLE 2

Prepared inventive polyether siloxanes

| Name | n + m + 2 | m | $R^1, R^2$ | Polyether residues R |
|---|---|---|---|---|
| PES I | 40 | 5 | —$CH_3$ | —$(CH_2)_3$—O—$(CH_2$—$CH_2$—O$)_{10}$—$(CH_2$—$CH(CH_3)$—O$)_2$—H |
| PES II | 40 | 3 | —R | —$(CH_2)_3$—O—$(CH_2$—$CH(CH_3)$—O$)_4$—$(CH_2$—$CH_2$—O$)_{12}$—$(CH_2$—$CH(CH_3)$—O$)_2$—H |
| PES III | 40 | 3 | —R | —$(CH_2)_3$—O—$(CH_2$—$CH_2$—O$)_{10}$—$(CH_2$—$C(CH_3)_2$—O$)_{1.5}$—H |
| PES IV | 60 | 8 | —$CH_3$ | 60 mol-%: —$(CH_2)_3$—(O—$(CH_2$—$CH_2$—O$)_{10}$—$(CH_2$—$CH(CH_3)$—O$)_2$—H |
|  |  |  |  | 40 mol-%: —$(CH_2)_3$—O—$(CH_2$—$CH_2$—O$)_{12}$—$CH_3$ |
| PES V | 30 | 3 | —$CH_3$ | —$(CH_2)_3$—O—$(CH_2$—$CH(CH_3)$—O$)_4$—$(CH_2$—$CH_2$—O$)_{12}$—$(CH_2$—$CH(CH_3)$—O$)_2$—H |

In a further preferred embodiment, the compositions according to the invention (siloxanes) are used in the continuous production of polyurethane- or polyisocyanurate-based panels having flexible surfacing layers. In this process, the foaming mixture is applied via one or more mix heads to the lower surfacing layer in a double band laminator at band speeds of up to above 50 m/min. In the laminator, the rising mixture then reaches the upper surfacing layer to produce a continuously formed panel which is cut into the desired length at the exit end of the laminator.

A multiplicity of different surfacing layers can be used, examples include paper, aluminium, bitumen, fibrous nonwoven webs, multilayered foils composed of various materials, etc.

Owing to the higher band speeds, the foaming mixture has to spread very uniformly within a short time in order that a homogeneous foam without densifications and irregular cell size distribution may form. Owing to the high discharge quantities which are required, rigs can also be used here which have more than one mix head, in which case the foaming mixture can then be discharged onto the laminator in a plurality of strands. This operation is also referred to as "finger lay down".

The very different material properties of the surfacing layers represent an additional challenge, since problems can Examples 1a to 1c which follow describe preparing the polyether siloxane PES I by way of example. All the other polyether siloxanes in Table 2 were obtained by reaction in analogous processes.

Example 1a

Synthesis of PES I, Preparing the Si—H-Functional Siloxane

A mixture of 244.7 g of decamethylcyclopentasiloxane ($D_5$), 31.7 g of poly(methyl)hydrosiloxane PTF1 (SiH content 15.75 eq/kg) and 14.5 g of hexamethyldisiloxane (HMDS) was reacted similarly to Example 1 of EP 1439200 (0.66 mol of $D_5$:0.0104 mol of PTF1:0.0896 mol of HMDS).

Example 1b

Synthesis of PES I, Preparing the Unsaturated Polyether

The allyl polyether was prepared similarly to the method described in Example 1 of DE 19940797 using 58.0 g (1 mol) of allyl alcohol as starter and 7.0 g (0.1 mol) of potassium methoxide in the initial charge and adding 440.5 g (10 mol) of ethylene oxide and, after complete reaction, a further 116.2 g (2 mol) of propylene oxide in metered fashion. The work-up was carried out similarly to Example 1 of DE 19940797.

Example 1c

Synthesis of PES I, Hydrosilylation

The hydrosilylation reaction (reactions of the Si—H-functional siloxane with the allyl polyethers) was carried out in accordance with Example 1 in EP 1 520 870. To this end, 291.0 g (0.1 mol) of the siloxane of Example 1a were reacted with 430.3 g (0.7 mol) of the polyether of Example 1b.

Example 2

Use Examples

The performance advantages over the prior art which are provided by using the inventive polyether siloxanes in rigid foam formulations will now be demonstrated using use examples.

The comparative foaming tests were carried out by hand mixing. For this purpose, polyol, flame retardant, catalysts, water, conventional or inventive foam stabilizer and blowing agent were weighed into a beaker and mixed by means of a disc stirrer (6 cm in diameter) at 1000 rpm for 30 s. The blowing agent quantity which had evaporated during mixing was determined by reweighing and replenished. The MDI was then added, the reaction mixture was stirred with the described stirrer at 3000 rpm for 5 s and immediately transferred into a thermostated aluminium mold lined with polyethylene film. The mold temperature and geometry varied with the foam formulation. The amount of foam formulation used was determined such that it was 15% above the minimum amount necessary to fill the mold.

One day after foaming, the foams were analyzed. Surface and internal defects were rated subjectively on a scale from 1 to 10, where 10 represents an undisrupted foam and 1 represents a very severely disrupted foam. The pore structure (average number of cells per cm) was assessed visually on a cut surface by comparison with comparative foams. The thermal conductivity coefficient was measured on 2.5 cm thick discs using a Hesto Lambda Control instrument at temperatures of 10° C. and 36° C. for the bottom side and the top side of the sample. The percentage volume fraction of closed cells was determined using an AccuPyc 1330 instrument from Micromeritics. The compressive strengths of the foams were measured on cube-shaped test specimens having an edge length of 5 cm in accordance with DIN 53421 to a compression of 10% (the maximum compressive stress occurring in this measuring range is reported).

Example 2a

PUR Rigid Foam System for Insulation of Cooling Appliances

A formulation adapted to this field of use was used (see Table 3) and separately foamed with three inventive polyether siloxane foam stabilizers (PES I, PES II and PES III) and two non-inventive polyether siloxane foam stabilizers (Tegostab B 1048, an exclusively butyl-capped polyether siloxane without free OH groups, and Tegostab B 8408, an OH-functional polyether siloxane with above 60% primary OH groups, both from Evonik Goldschmidt GmbH). The reaction mixture was introduced into a 145 cm×14.5 cm×3.5 cm aluminium mold thermostatted to 45° C.

TABLE 3

Formulation for Example 2a

| Component | Weight fraction |
|---|---|
| Daltolac R 471* | 100 parts |
| N,N-dimethylcyclohexylamine | 1.5 parts |
| Water | 2.6 parts |
| Cyclopentane | 13.1 parts |
| polyether siloxane | 1.5 parts |
| Desmodur 44V20L** | 198.5 parts |

*polyether polyol from Huntsman
**polymeric MDI from Bayer, 200 mPa * s, 31.5% by weight NCO, functionality 2.7

The results reported in Table 4 show that the inventive polyether siloxanes consistently lead to rigid foams having lower thermal conductivities than those utilizing the polyether siloxanes representing the prior art. In the case of PES II and PES III, moreover, the foam surface is less disrupted than in the case of the comparative stabilizers.

TABLE 4

Results for refrigerator insulation

| Stabilizer | Defects top/bottom/inside (1-10) | Cells/cm | $\lambda$ value [mW/m * K] | Closed cell content [%] |
|---|---|---|---|---|
| PES I | 7/6/6 | 40-44 | 22.1 | 94 |
| PES II | 8/7/6 | 40-44 | 22.3 | 91 |
| PES III | 8/7/6 | 40-44 | 22.2 | 90 |
| B 1048* | 7/6/6 | 35-39 | 22.7 | 92 |
| B 8408* | 7/6/5 | 35-39 | 23.2 | 89 |

*non-inventive, comparative examples; TEGOSTAB B 1048 and TEGOSTAB B 8408 are polyether siloxane foam stabilizers from Evonik Goldschmidt GmbH

Example 2b

PUR Rigid Foam System for Metal Composite Elements

A formulation adapted to this field of use was used (see Table 5) and separately foamed with an inventive polyether siloxane foam stabilizer (PES IV) and two non-inventive polyether siloxane foam stabilizers (Tegostab B 8443, a fully endblocked polyether siloxane without free OH groups, and Tegostab B 8486, an OH-functional polyether siloxane with exclusively primary OH groups, both from Evonik Goldschmidt GmbH). The reaction mixture was introduced into a 50 cm×50 cm×5 cm aluminium mold thermostatted to 40° C., into which a steel sheet surfacing layer had previously been placed on the bottom thereof. The next day, the metal sheet was pulled off the foam and the foam assessed thereafter.

TABLE 5

Formulations for metal composite element

| Component | Weight fraction |
|---|---|
| polyether polyol blend | 70 parts |
| tris(1-chloro-2-propyl) phosphate | 30 parts |
| N,N,N',N'',N''-pentamethyldiethylenetriamine | 0.2 parts |
| N,N-dimethylcyclohexylamine | 2.0 parts |
| water | 2.5 parts |
| n-pentane | 6.0 parts |
| polyether siloxane | 2.0 parts |
| Desmodur 44V20L** | 140 parts |

**polymeric MDI from Bayer, 200 mPa * s, 31.5% by weight of NCO, functionality 2.7

Figure 1B:
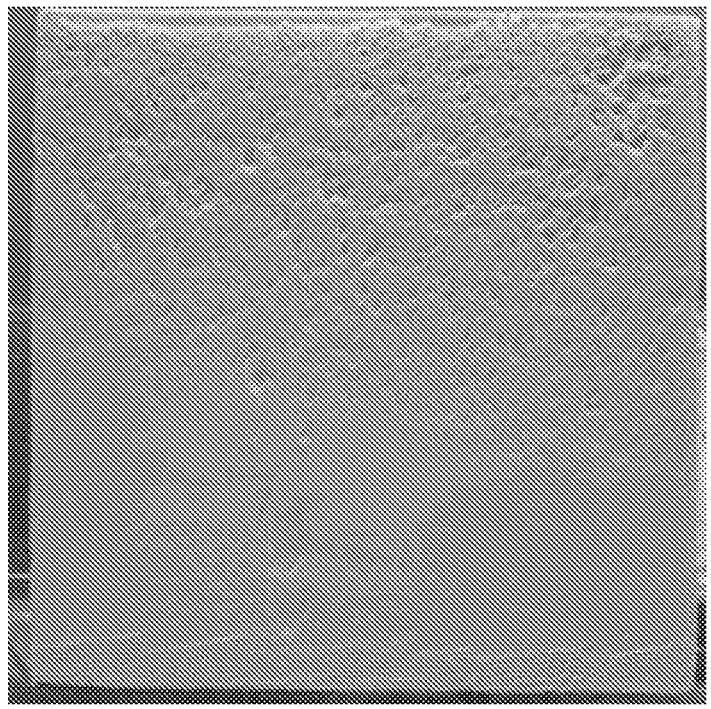
FIG. 1B is an actual picture of a foam obtained using a polyether siloxane from the prior art.
Figure 1C:
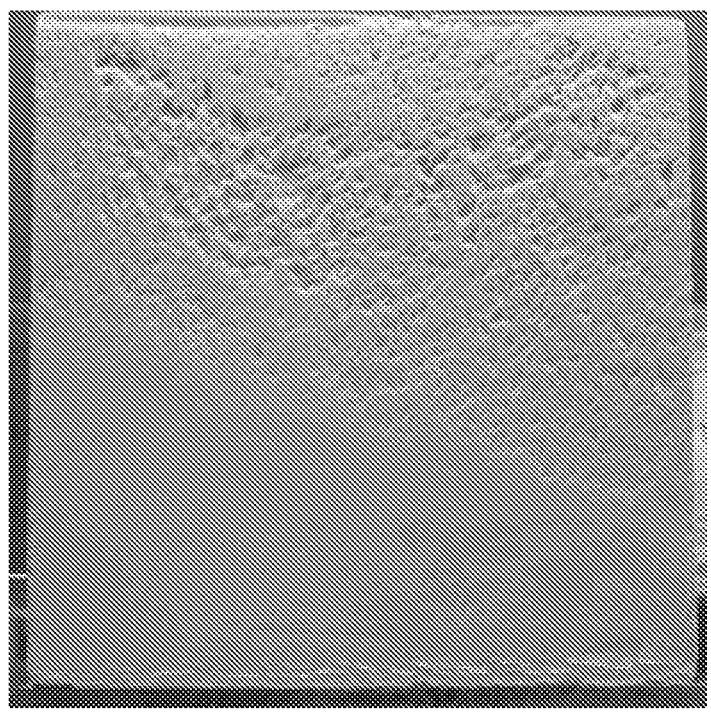
FIG. 1C is an actual picture of a foam obtained using another polyether siloxane from the prior art.

The results reported in Table 6 show that the inventive polyether siloxane again offers lower thermal conductivities than the two non-inventive, comparative stabilizers. After the steel sheet surfacing layer had been peeled off the bottom side of the foam, the foam defects underneath became visible. FIG. 1A shows a photograph of the surface obtained using the inventive polyether siloxane PES IV. FIGS. 1B and 1C show photographs of the surfaces obtained using the non-inventive polyether siloxane B 8443 (FIG. 1b) and B 8486 (FIG. 1c), respectively.

The inventive polyether siloxane PES IV shows a distinct reduction in void formation and therefore offers better surface quality than the comparative products.

TABLE 6

Results for metal composite element

| Stabilizer | Defects top/bottom/inside (1-10) | Cells/cm | λ value [mW/m * K] | Closed cell content [%] |
|---|---|---|---|---|
| PES IV | 7/**/8 | 45-50 | 22.0 | 91 |
| B 8443* | 7/**/8 | 45-50 | 22.3 | 94 |
| B 8486* | 7/**/7 | 40-44 | 23.0 | 93 |

*non-inventive, comparative examples; TEGOSTAB B 8443 and TEGOSTAB B 8486 are polyether siloxane foam stabilizers from Evonik Goldschmidt GmbH
**bottom side foam quality after removal of metal sheet is shown in FIGS. 1a to 1c.

Example 2c

PIR Rigid Foam System for Insulation Board

A formulation adapted to this field of use was used (Table 7), and separately foamed with an inventive polyether siloxane foam stabilizer (PES V) and two non-inventive polyether siloxane foam stabilizers (Tegostab B 1048, an exclusively butyl-capped polyether siloxane without free OH groups and Tegostab B 8466, an OH-functional polyether siloxane having exclusively primary OH groups, both from Evonik Goldschmidt GmbH). The reaction mixture was introduced into a 50 cm×25 cm×5 cm aluminium mold thermostatted to 50° C.

TABLE 7

Formulations for insulation board

| Component | Weight fraction |
|---|---|
| Stepanpol PS 2352* | 100 parts |
| tris(1-chloro-2-propyl) phosphate | 15 parts |
| N,N,N',N",N"-pentamethyldiethylenetriamine | 0.2 parts |
| potassium octoate (75 wt % in diethylene glycol) | 4.0 parts |
| water | 0.4 parts |
| n-pentane | 20 parts |
| polyether siloxane | 2.0 parts |
| Desmodur 44V20L** | 200 parts |

*polyester polyol from Stepan
**polymeric MDI from Bayer, 200 mPa * s, 31.5% by weight of NCO, functionality 2.7

The results reported in Table 8 show once more that the foams produced using the inventive polyether siloxane have lower thermal conductivities and better foam quality on the bottom side than the foams obtained using the two non-inventive, comparative products.

TABLE 8

Results for insulation board

| Stabilizer | Defects top/bottom/inside (1-10) | Cells/cm | λ value [mW/m * K] | Closed cell content [%] |
|---|---|---|---|---|
| PES V | 6/8/8 | 45-50 | 22.5 | 94 |
| B 1048* | 6/7/8 | 45-50 | 23.0 | 92 |
| B 8466* | 6/7/8 | 45-50 | 22.8 | 94 |

*non-inventive, comparative examples; TEGOSTAB B 1048 and TEGOSTAB B 8466 are polyether siloxane foam stabilizers from Evonik Goldschmidt GmbH While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:
1. A polyether siloxane of formula (I),

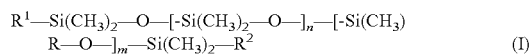

where
R, $R^1$ and $R^2$ are the same or different,
R in each occurrence is the same or different and represents —$(CH_2)_x$—O—$(CH_2$—$CR'R''$—O$)_y$—R''',
R' and R" are the same or different and independently represent —H, —$CH_3$, —$CH_2CH_3$ or phenyl, R''' represents —H, alkyl or acyl,
$R^1$ and $R^2$ each represent R,
wherein the alkylene oxide units $CH_2$—$CR'R''$—O within a polyether residue R can be the same or different and the polyether residues R within a polyether siloxane molecule of formula (I) can be the same or different, wherein on number average, averaged over all compounds of formula (I)
n+m+2=>10 to 200,
m=3 to 40,
x=2 to 10,
y=1 to 50,
at least 25% of the R''' radicals represent hydrogen and at least 50% of all polyether residues R which have R'''=—H have a secondary or tertiary OH end group, wherein on number average, averaged over all compounds of formula (I), at least 45 mol % of the alkylene oxide units $CH_2$—$CR'R''$—O are ethylene oxide units with R'=R"=—H, provided that at least a portion of the alkylene oxide units $CH_2$—$CR'R''$—O include an endblock of alkylene oxide units where R' and/or R" is other than —H with R''' as H to provide said secondary or tertiary OH end groups.

2. The polyether siloxane of claim 1, wherein on average n+m+2=15 to 100, x=3 and y=5 to 25.

3. A composition for producing rigid polyurethane or polyisocyanurate foams, said composition comprising at least one isocyanate component, at least one polyol component, at least one foam stabilizer, at least one urethane and/or isocyanurate catalyst, water and/or blowing agent, wherein said at least one foam stabilizer comprises a polyether siloxane of formula (I),

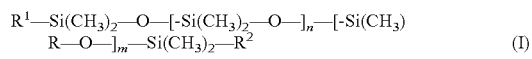

where

R, $R^1$ and $R^2$ are the same or different,

R in each occurrence is the same or different and represents —$(CH_2)_x$—O—$(CH_2$—CR'R"—O$)_y$—R''', R' and R" are the same or different and independently represent —H, —$CH_3$, —$CH_2CH_3$ or phenyl, R''' represents —H, alkyl or acyl, $R^1$ and $R^2$ each represent R, wherein the alkylene oxide units $CH_2$—CR'R"—O within a polyether residue R can be the same or different and the polyether residues R within a polyether siloxane molecule of formula (I) can be the same or different, wherein on number average, averaged over all compounds of formula (I)

n+m+2=>10 to 200, m=3 to 40, x=2 to 10, y=1 to 50, at least 25% of the R''' radicals represent hydrogen and at least 50% of all polyether residues R which have R'''=—H have a secondary or tertiary OH end group, wherein on number average, averaged over all compounds of formula (I), at least 45 mol % of the alkylene oxide units $CH_2$—CR'R"—O are ethylene oxide units with R'=R"=—H, provided that at least a portion of the alkylene oxide units $CH_2$—CR'R"—O include an endblock of alkylene oxide units where R' and/or R" is other than —H with R''' as H to provide said secondary or tertiary OH end groups.

4. A process for producing a rigid polyurethane or polyisocyanurate foam, comprising reacting at least one isocyanate component, at least one polyol component, at least one foam stabilizer, at least one urethane and/or isocyanurate catalyst, water and/or blowing agent together, wherein said at least one foam stabilizer comprises a polyether siloxane of formula (I),

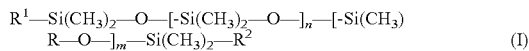  (I)

where

R, $R^1$ and $R^2$ are the same or different,

R in each occurrence is the same or different and represents —$(CH_2)_x$—O—$(CH_2$—CR'R"—O$)_y$—R''', R' and R" are the same or different and independently represent —H, —$CH_3$, —$CH_2CH_3$ or phenyl, R''' represents —H, alkyl or acyl, $R^1$ and $R^2$ each represent R, wherein the alkylene oxide units $CH_2$—CR'R"—O within a polyether residue R can be the same or different and the polyether residues R within a polyether siloxane molecule of formula (I) can be the same or different, wherein on number average, averaged over all compounds of formula (I)

n+m+2=>10 to 200, m=3 to 40, x=2 to 10, y=1 to 50, at least 25% of the R''' radicals represent hydrogen and at least 50% of all polyether residues R which have R'''=—H have a secondary or tertiary OH end group, wherein on number average, averaged over all compounds of formula (I), at least 45 mol % of the alkylene oxide units $CH_2$—CR'R"—O are ethylene oxide units with R'=R"=—H, provided that at least a portion of the alkylene oxide units $CH_2$—CR'R"—O include an endblock of alkylene oxide units where R' and/or R" is other than —H with R''' as H to provide said secondary or tertiary OH end groups.

5. A rigid polyurethane or polyisocyanurate foam formed by the process of claim 4.

6. The rigid polyurethane or polyisocyanurate foam of claim 5, wherein said foam contains from 0.1 to 10 parts by mass of said at least one foam stabilizer based on 100 parts by mass of polyol component.

7. The rigid polyurethane or polyisocyanurate foam of claim 6, wherein said foam is processed into an insulation board, an insulant, or a cooling apparatus.

8. The polyether siloxane of claim 1, provided that at least a portion of the alkylene oxide units $CH_2$—CR'R"—O includes an endblock containing on average 0.5 to 5 alkylene oxide units where R' and/or R" is other than —H with R''' as H to provide said secondary or tertiary OH end groups.

9. A polyether siloxane of formula (I),

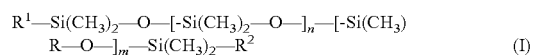  (I)

where

R, $R^1$ and $R^2$ are the same or different,

R in each occurrence is the same or different and represents —$(CH_2)_x$—O—$(CH_2$—CR'R"—O$)_y$—R''', R' and R" are the same or different and independently represent —H, —$CH_3$, —$CH_2CH_3$ or phenyl, R''' represents —H, alkyl or acyl, $R^1$ and $R^2$ each represent R, wherein the alkylene oxide units $CH_2$—CR'R"—O within a polyether residue R can be the same or different and the polyether residues R within a polyether siloxane molecule of formula (I) can be the same or different, wherein on number average, averaged over all compounds of formula (I)

n+m+2=>10 to 200, m=0 to 40, x=2 to 10, y=1 to 50, at least 25% of the R''' radicals represent hydrogen and at least 50% of all polyether residues R which have R'''=—H have a secondary or tertiary OH end group, wherein on number average, averaged over all compounds of formula (I), at least 45 mol % of the alkylene oxide units $CH_2$—CR'R"—O are ethylene oxide units with R'=R"=—H, provided that at least a portion of the alkylene oxide units $CH_2$—CR'R"—O includes an endblock containing on average 0.5 to 5 alkylene oxide units where R' and/or R" is other than —H with R''' as H to provide said secondary or tertiary OH end groups.

* * * * *